United States Patent [19]

Leising

[11] Patent Number: 4,791,161

[45] Date of Patent: Dec. 13, 1988

[54] CATIONIC LATICES OF COPOLYMERS BASED ON CONJUGATED DIENES

[75] Inventor: Frederic Leising, Vaujours, France

[73] Assignee: Rhone-Poulenc Specialites Chimiques, Courbevoie, France

[21] Appl. No.: 867,601

[22] Filed: May 27, 1986

Related U.S. Application Data

[63] Continuation of Ser. No. 573,835, Jan. 25, 1984, abandoned.

[30] Foreign Application Priority Data

Jan. 28, 1983 [FR] France ............................... 83 01303

[51] Int. Cl.[4] .............................................. C08L 41/00
[52] U.S. Cl. .................................... 524/458; 524/457
[58] Field of Search ......................................... 524/458

[56] References Cited

U.S. PATENT DOCUMENTS

| | | | |
|---|---|---|---|
| 2,512,697 | 6/1950 | Grotenhuis | 260/29.7 |
| 2,746,943 | 5/1956 | Pritchard | 260/29.6 |
| 2,808,388 | 10/1957 | Hellmann | 260/45.5 |
| 2,870,118 | 1/1959 | Bäder | 525/255 |
| 2,965,594 | 12/1960 | Maeder | 260/29.6 |
| 3,108,979 | 10/1963 | Le Ferre et al. | 260/29.6 |
| 3,253,941 | 5/1966 | Finn et al. | 117/6 |
| 3,321,431 | 5/1967 | McNab et al. | 260/29.6 |
| 3,404,114 | 10/1968 | Snyder et al. | 524/812 |
| 3,594,453 | 7/1971 | Cusano | 525/259 |
| 3,635,867 | 1/1972 | Yuille | 260/29.4 UA |
| 4,017,440 | 4/1977 | Killam | 260/29.6 HN |
| 4,051,093 | 9/1977 | Wendel et al. | 260/29.6 TA |
| 4,064,091 | 12/1977 | Samour et al. | 260/29.6 HN |
| 4,111,922 | 9/1978 | Beede et al. | 526/292 |
| 4,154,910 | 5/1979 | Tanaka et al. | 521/63 |
| 4,166,882 | 9/1979 | Das et al. | 428/463 |
| 4,304,703 | 12/1981 | Das | 525/279 |
| 4,314,044 | 2/1982 | Hughes et al. | 260/29.6 M |
| 4,337,185 | 6/1982 | Wessling et al. | 524/458 |
| 4,349,641 | 9/1982 | Maslanka et al. | 525/279 |
| 4,373,056 | 2/1983 | Besecke et al. | 524/547 |
| 4,403,065 | 9/1983 | Yoshioka et al. | 524/816 |
| 4,426,489 | 1/1984 | Wessling et al. | 524/815 |

FOREIGN PATENT DOCUMENTS

2013221 1/1979 United Kingdom .

OTHER PUBLICATIONS

Chemical Abstracts, vol. 94, No. 16338t: Cationic Emulsions.

Primary Examiner—Joseph L. Schofer
Assistant Examiner—J. M. Reddick
Attorney, Agent, or Firm—Finnegan, Henderson, Farabow, Garrett & Dunner

[57] ABSTRACT

The present invention provides a cationic latex of copolymers based on conjugated dienes, formed by the steps of preparing an aqueous dispersion of particles by reacting at least one unsaturated tertiary nitrogen compound not capable of being hydrolyzed in an acid or alkaline medium with an aqueous emulsion reaction medium, containing cationic species, of at least one non-ionic monomer capable of being copolymerized with the non-hydrolyzable unsaturated nitrogen compound to form synthetic polymers and at least one substance which generates cationic species capable of chemically binding with the synthetic polymers; the non-ionic monomer being converted to polymer in the reaction in a degree of up to at least about 30%; and polymerizing, in the aqueous dispersion, at least one conjugated diene or a mixture of conjugated dienes and at least one non-ionic monomer in the presence of an initiator selected from the group consisting of an uncharged initiator and a cationic charge-generating initiator.

27 Claims, No Drawings

CATIONIC LATICES OF COPOLYMERS BASED ON CONJUGATED DIENES

This application is a continuation of application Ser. No. 753,835, filed Jan. 25, 1984, now abandoned.

FIELD OF THE INVENTION

The present invention relates to cationic latices of copolymers based on conjugated dienes obtained by emulsion polymerization of conjugated dienes and non-ionic monomers in a cationic aqueous dispersion of particles. A process for preparing the cationic latices of copolymers based on conjugated dienes is also disclosed.

BACKGROUND OF THE INVENTION

It is known in the art that cationic latices can be prepared in two steps. U.S. Pat. No. 3,399,159 discloses a process of preparing cationic latices comprising the steps of polymerizing a nitrogen-containing monomer such as vinylpyridine or tert-butylaminoethyl methacrylate, with an alkyl acrylate, in the absence of an emulsifier and in an acidic medium with a pH of 1 to 3.5, thereby producing an aqueous dispersion in which a diene is then polymerized. However, the latices prepared by this process cannot be used in a basic medium because their cationic charge density is too low at a basic pH. Therefore, it is the object of this invention to obtain cationic latices which can be used at any pH.

SUMMARY OF THE INVENTION

The process of the present invention for preparing cationic latices of copolymers based on conjugated dienes comprises the steps of preparing a cationic aqueous dispersion of particles by reacting at least one unsaturated, tertiary nitrogen compound, not capable of being hydrolyzed in an acid or alkaline medium, with an aqueous emulsion reaction medium, containing cationic species, of at least one non-ionic monomer capable of being copolymerized with the nitrogen compound to form synthetic polymers, and at least one substance which generates cationic species and which is capable of chemically binding with the polymers, the reaction occurring until at least about 30% of the the non-ionic monomer has been converted to polymers; and polymerizing, in the aqueous dispersion, at least one conjugated diene and at least one non-ionic monomer in the presence of an initiator selected from the group consisting of an uncharged initiator and a cationic-charge-generating initiator.

The invention also includes cationic latices of copolymers based on conjugated dienes obtained by preparing the cationic aqueous dispersion of particles and polymerizing, in the aqueous dispersion, at least one conjugated diene, and if appropriate, at least one non-ionic monomer in the presence of an uncharged initiator or a cationic-charge-generating initiator.

DETAILED DESCRIPTION OF THE INVENTION

As embodied herein, the cationic latices of copolymers based on conjugated dienes of the present invention can be made by a two step process. First a cationic aqueous dispersion of particles is prepared by reacting at least one unsaturated tertiary nitrogen compound not capable of being hydrolyzed in an acid or alkaline medium, with an aqueous emulsion reaction medium, containing cationic species. The aqueous emulsion reaction medium contains at least one non-ionic monomer capable of being copolymerized with the unsaturated nitrogen compound to form synthetic polymers, and at least one substance which generates cationic species capable of chemically binding with the synthetic polymers. The reaction occurs until about 30% of the non-ionic monomer has been converted to polymers, and, thereafter, at least one conjugated diene or a mixture of at least one conjugated diene and at least one non-ionic monomer in the presence of an initiator selected from the group consisting of an uncharged initiator and a cationic charge-generating initiator is polymerized in the previously prepared cationic aqueous dispersion.

As defined herein, the term "unsaturated tertiary nitrogen compound which is non-hydrolyzable in an acid or alkaline medium" is any unsaturated nitrogen compound which does not have a quaternary ammonium group, which has a nitrogen atom trisubsituted by hydrocarbon groups, and which has a degree of hydrolysis of no more than about 5% in an acid or alkaline medium at the polymerization temperature may be used as the unsaturated tertiary nitrogen compound. Examples of such compounds include:

(1) The N-(ω-dialkylaminoalkyl)-amides of unsaturated carboxylic acids having the formula:

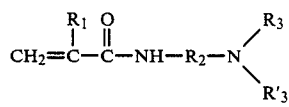

wherein $R_1$ is a hydrogen atom or a $C_1-C_4$ alkyl group, preferably a $C_1-C_2$ alkyl group, $R_2$ is a $C_1-C_{12}$ alkylene group, preferably a $C_1-C_8$ alkylene group, and $R_3$ and $R'_3$ is a $C_1-C_6$ alkyl group, preferably a $C_1-C_4$ alkyl group, or a phenyl group, optionally substituted by a $C_1-C_9$ alkyl radical. Specifically, dimethylaminomethylacrylamide or dimethylaminomethylmethacrylamide and dimethylaminoethylacrylamide or dimethylaminoethylmethacrylamide correspond to this formula.

(2) Unsaturated amino-esters having the formula:

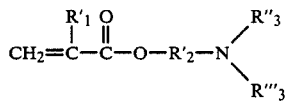

where $R'_1$ is a $C_1-C_5$ alkyl group, preferably a $C_1-C_2$ alkyl group, $R'_2$ is a linear or branched alkylene group with at least 2 carbon atoms, preferably a $C_2-C_{12}$ alkylene group, more preferably, a $C_2-C_8$ alkylene group, and $R''_3$ and $R'''_3$, which may be identical or different, are either a $C_1-C_6$ alkyl group, preferably a $C_1-C_4$ alkyl group, optionally substituted by a hydroxyl radical, or a phenyl group, optionally substituted by a $C_1-C_9$ alkyl radical, with the total number of carbon atoms in the radicals $R'_2$, $R''_3$ and $R'''_3$ being greater than 8, preferably greater than or equal to 10. Specific examples of compounds which correspond to this formula include ditert-butylaminoethyl methacrylate, ditert-butylaminopropyl methacrylate and dipentylaminoethyl methacrylate.

(3) Heterocyclic nitrogen compounds containing a nitrogen or carbon atom substituted by a vinyl group, such as 2-vinylpyridine, 4-vinylpyridine, 1-ethyl-2- vinylpyridine, 1-benzyl-4-vinylpyridine, 1,2-dimethyl-5-vinylpyridine, 1-methyl-2-vinylquinoline, N-vinyl-N'-methylimidazole, and 1-vinyl-3-methyl benzimidazole.

Typical non-ionic monomers which are copolymeriazable with the nonhydrolyzable, unsaturated tertiary nitrogen compounds and which may be employed in the claimed invention include: vinylaromatic compounds such as styrene, α-methylstyrene, vinyltoluene, and monochlorostyrene, vinyl esters such as vinyl acetate, vinyl propionate, vinyl versatate, and vinyl butyrate, ethylenic nitriles such as acrylonitrile and methacrylonitrile, ethylenic carboxylic acid esters such as methyl, ethyl, propyl, isopropyl, butyl, 2-ethylhexyl, hydroxyethyl, hydroxypropyl or glycidyl acrylate, and methyl, ethyl, propyl, butyl, hydroxyethyl, hydroxypropyl or glycidyl methacrylate, dialkyl esters of ethylenic dicarboxylic acids, such as dialkyl esters of fumaric acid, maleic acid, and itaconic acid, and ethylenic amides and the N-substituted derivaties of ethylenic amides such as acrylamide, methacrylamide, N-methylolacrylamide or N-methylolmethacrylamide, N-methoxymethylacrylamide or N-methoxymethylmethacrylamide.

The non-ionic monomers may be used individually or, if they are capable of being copolymerized with one another, as a mixture.

The substance which generates cationic species must be either a non-hydrolyzable or partially hydrolyzable product. A substance which generates cationic species is partially hydrolyzable if its level of hydrolysis under polymerization conditions is less than or equal to 50%.

Exemplary substances include (1) polymerization initiators generating radicals with cationic ends, such as 2,2'-azobis-(2-amidinopropane) hydrochloride and azobis-N,N'-dimethyleneisobutyramidine hydrochloride; (2) unsaturated salts of a polycoordinated onium of a Group 5a or 6a element, such as nitrogen, phosphorus or sulfur, which are capable of being copolymerized with the non-ionic monomer, and (3) suitable mixtures thereof.

As defined herein, any salt with an onium cation, in which all the Group 5a or 6a element valences are satisfied by hydrocarbon groups, at least one of which hydrocarbons is unsaturated, and in which the free valency of the Group 5a or 6a element is saturated by a carbon atom is considered an "unsaturated salt of a polycoordinated onium of a group 5a or 6a element." Examples of such unsaturated salts are the unsaturated quaternary ammonium salts having the following formula:

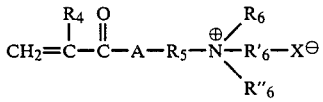

where $X^-$ is $Cl^-$, $Br^-$, $I^-$, $SO_4H^-$, $SO_4^{--}$, $CH_3SO_4^-$, $C_2H_5SO_4^-$ and $CH_3COO^-$, $R_4$ is a hydrogen atom or a methyl group, A is an oxygen atom or an —NH— group, $R_5$ is a linear or branched alkylene group with 1 to 18 carbon atoms, preferably from 1 to 10 carbon atoms, $R_6$, $R'_6$ and $R''_6$, which may be identical or different, are either an alkyl group with 1 to 4 carbon atoms, optionally substituted by a hydroxyl radical, or a phenyl group, optionally substituted by an alkyl radical with 1 to 9 carbon atoms, with the total number of carbon atoms present in the groups $R_5$, $R_6$, $R'_6$, and $R''_6$ being greater than 4 when A is oxygen.

Typical quaternary ammonium salts which correspond to this formula include trimethylaminoethylacrylamide chloride, trimethylaminopropylacrylamide bromide or trimethylaminopropylmethacrylamide bromide, trimethylaminobutylacrylamide methyl-sulfate or trimethylaminobutylmethacrylamide methyl-sulfate, and trimethylaminopropylmethacrylate chloride.

In addition to quaternary ammonium salts, other representative saturated onium salts include unsaturated salts of pyridinium, quinolinium, imidazolium, and benzimidazolium. Specific examples of such onium salts include 1-methyl-2-vinylpyridinium bromide, 1-ethyl-2-vinylpyridinium chloride, 1-ethyl-2-vinylpyridinium methyl-sulfate, 1-benzyl-4-vinylpyridinium chloride, 1-methyl-2-vinylquinolinium iodide, N-vinyl-N'-methylimidazolium bromide, 1-vinyl-3-methylbenzimidazolium bromide, (2-methacryloxy)dimethylsulfonium chloride, methyldiallylsulfonium methyl-sulfate and trimethylvinylphosphonium bromide.

The nitrogen compound may be added to the reaction medium during any stage of the polymerization of the non-ionic monomer. For example, the nitrogen compound may be present in the reaction medium from the start of the polymerization of the non-ionic monomer, particularly if polymerization of the monomer is not to be taken to completion.

The nitrogen compound may also be introduced continuously or batchwise throughout the polymerization of the non-ionic monomer, particularly if the polymerization of the monomer is to be taken to completion. Similarly, the nitrogen compound may be added to the reaction medium after a certain amount, e.g., above 30%, of the non-ionic monomer has been converted to polymer or at the end of the polymerization of the non-ionic monomer, i.e., when about 90 to 98% of the monomer has been converted to polymers.

The substance-generating cationic species can be added to the reaction medium before or simultaneously with the non-hydrolyzable, unsaturated tertiary nitrogen compound. The substance may also be present in the reaction medium at the start of the polymerization operation in the form of a cationic seed, i.e., in the form of a polymer or copolymer prepared beforehand by aqueous emulsion polymerization of the non-ionic monomer, in a cationic medium, in the presence of a desired amount of substance which generates cationic species.

The amounts required of substance which generates cationic species and of non-hydrolyzable, unsaturated tertiary nitrogen compound depend upon the amount of non-ionic monomer used. For every 100 parts by weight of non-ionic monomer used, from about 1 to 20, preferably from 2 to 10, parts by weight of the substance which generates cationic species and at least 4, preferably from 4 to 15, parts by weight of the substance and the nitrogen compound, taken together, should be used.

The first step of the process of the present invention, i.e., copolymerization of the nitrogen compound and the non-ionic monomer, is carried out under conventional aqueous emulsion polymerization conditions, in a cationic medium, at a temperature of between about 60° C. and 90° C., preferably between about 75° C. and 85° C., at pH from about 3 to 12, preferably from 5 to 9, and in the presence of a cationic or non-ionic initiator (including excess cationic initiator) and, optionally, in the presence of a cationic or non-ionic emulsifying agent, and, as aforementioned, in the presence of the substance which generates cationic species.

Those substances mentioned as examples of substances which generate cationic species, may also be used as cationic initiators in the claimed invention.

Examples of non-ionic initiators which may be used in the present invention include (1) inorganic or organic peroxides and hydroperoxides soluble in water or organic solvents and which generate uncharged free radicals, such as hydrogen peroxide, benzoyl peroxide, tert-butyl hydroperoxide, cumene hydroperoxide, tert-butyl perbenzoate, diisopropylbenzene peroxide and methyl ethyl ketone peroxide; (2) the redox systems obtained by combining with the peroxides or hydroperoxides a reducing agent such as ascorbic acid, sugars, polyvalent metal salts, the sulfites, dithionites, sulfoxalates, thiosulfates or bisulfites of sodium or calcium or the formaldehydesulfoxylate of sodium or zinc; and (3) azoaliphatic compounds having an acyclic azo group and at least one aliphatic carbon atom on each nitrogen atom, at least one of the carbon atoms being tertiary, such as azobisisobutyronitrile, 2,2'-azobis(2,4-dimethylvaleronitrile) and 2,2'-azobis(2,4-dimethyl-4-methoxyvaleronitrile).

Exemplary non-ionic emulsifiers include polyethoxylated fatty alcohols, polyethoxylated alkylphenols, polyethoxylated fatty acids.

Typical cationic emulsifiers include decylammonium methylsulfate, N-ethyldodecylammonium bromide, cetylammonium chloride, cetylammonium bromide, stearylammonim bromide, cetyldimethylbenzylammonium bromide, N,N-dimethyldodecylammonium chloride, N-methyltridecylammonium iodide and the chlorides, bromides, sulfates, methylsulfates or acetates of ethoxylated fatty amines.

The amount of initiator used in the polymerization process depends upon both the monomer used and the polymerization temperature, and is generally about 0.1 to 5%, preferably about 0.1 to 2%, by weight, relative to the total weight of all monomers used. However, if the initiator or emulsifier is the primary constituent or one of the primary constituents which generates cationic species, a proportional amount of additional initiator or emulsifier is used.

The amount of cationic or non-ionic emulsifier used to stabilize the copolymer particles can range up to about 2% of the total weight of the monomers.

Exemplary conjugates dienes which may be polymerized during the second step of the present invention in the aqueous dispersion to form the cationic latices of the present invention include butadiene, isoprene, chloroprene, penta-1,3-diene, dimethylbutadiene, cyclopentadiene and suitable mixtures thereof.

The preferred amount of diene is about 20 to 80% by weight, prefeably 25 to 65% by weight, relative to the total weight of all monomers used in the whole two step process.

The amount of non-ionic monomer polymerized with the conjugated diene in the second step of the invention can be as much as about 80% by weight of the total amount of monomers used both to prepare the aqueous dispersion and to polymerize, in the dispersion, the diene and the monomer.

The temperature, initiators, and pH conditions of the second step, i.e., polymerization of the conjugated diene, are similar to those of the polymerization of the first step. A chain regulator and an additional amount of uncharged initiator or cationic charge-generating initiator may be present.

Examples of such chain regulators are mercaptans, such as n-butylmercaptan, n-octylmercaptan, n-laurylmercaptan and t-dodecylmercaptan, and halogen derivatives such as carbon tetrabromide.

The cationic latices of copolymers based on conjugated dienes which form the subject of the invention have a zeta potential which varies from about +80 mV to +20 mV when the pH varies from about 2 to 12.

The cationic latices of the invention may be used as binders for coating papers, for preparing non-woven sails, and for covering metallic substrates.

The exemplary substances of the constituents of the claimed cationic latices and the examples which follow are illustrative of the claimed process and should not be construed as limiting the invention delineated in the claims.

EXAMPLE 1

(A) Step 1

The following are charged into a cold autoclave with a 5 liter capacity and an anchor-type stirrer rotating at 180 rpm:

866 g of deionized water
7.5 g of cetyldimethylbenzylammonium bromide
15 g of trimethylaminopropylmethacrylamide chloride
15 g of dimethylaminopropylmethacrylamide.

The temperature of the autoclave is raised to 75° C. When the working temperature is reached, the following ingredients are added:

(a) 7.5 g of 2,2'-azobis(2-amidinopropane) hydrochloride and 50 g of deionized water are added simultaneously and all at once, and (b) 750 g of butyl acrylate, 660 g of styrene, and 60 g of dimethylaminopropylmethacrylamide are added continuously at a constant rate over 5 hours.

Ten minutes after the working temperature is reached, the following are added continuously at a constant rate over 7 hours:

15 g of 2,2'-azobis(2-amidinopropane) hydrochloride
420 g of deionized water.

After a total reaction time of 11 hours, the reaction is stopped by cooling.

The degree of conversion is 99%.

A dispersion with the following characteristics is obtained:

| | |
|---|---|
| pH | 7.8 |
| Solids content | 43.1% by weight |
| Brookfield viscosity (50 rpm) | 240 mPa/s |
| Average particle diameter | 0.1μ |

The cationic character of the produced dispersion is demonstrated by measuring the zeta potential as a function of pH, using a MARK II microelectrophoresis instrument manufactured by RANK BROTHERS, of a dispersion with a polymer concentration of 0.05%, at 80 volts and 25° C.

The results of this measurement are as follows:

| pH | Zeta potential in mV |
|---|---|
| 4 | +66 |
| 6 | +52 |
| 8 | +30 |

| pH | Zeta potential in mV |
|----|----------------------|
| 10 | +22 |

(B) Step 2

900 g of deionized water and 173.85 g of the dispersion of step 1 are charged into a cold autoclave with 5 liter capacity and a propeller-type stirrer rotating at 150 rpm.

The temperature of the autoclave is raised to 75° C.

When the working temperature is reached, the following are introduced at a constant rate over 5 hours:
555 g of styrene
855 g of butadiene
9.75 g of tert-dodecylmercaptan.

The following are then introduced continuously at a constant rate over 7 hours:
15 g of 2,2'-azobis(2-amidinopropane) hydrochloride and 375 g of deionized water
15 g of nonylphenol oxyethyleneated with 30 units of ethylene oxide.

After a running time of 12 hours, 30 minutes, the reaction is stopped by cooling.

A dispersion with the following characteristics is obtained:

| pH | 7.8 |
|----|-----|
| Solids content | 45% |
| Brookfield viscosity (50 rpm) | 112 mPa/s |
| Average Particle diameter | 0.25μ |

The zeta potential measurements are as follows:

| pH | Zeta potential in mV |
|----|----------------------|
| 4  | +42 |
| 6  | +30 |
| 8  | +18 |
| 10 | +18 |

EXAMPLE 2

(A) Step 1

The process of Example 1, step 1 is repeated.

(B) Step 2

The following are charged into a cold autoclave:
900 g of deionized water
173.85 g of the dispersion prepared in step 1.

The temperature of the autoclave is raised to 75° C.

When the working temperature is reached, the following are added at a constant rate over 5 hours:
720 g of styrene
555 of butadiene
225 g of methyl methacrylate.

The following are then added continuously at a constant rate over 7 hours:
15 g of -azobis-isobutyronitrile
15 g of nonylphenol oxyethyleneated with 30 units of ethylene oxide.

After a running time of 12 hours, 30 minutes, the reaction is stopped by cooling.

A dispersion with the following characteristics is obtained:

| pH | 6.2 |
|----|-----|
| Solids content | 42% |
| Brookfield viscosity (50 rpm) | 105 mPa/s |
| Average particle diameter | 0.25μ |

The zeta potential measurements are as follows:

| pH | Zeta potential in mV |
|----|----------------------|
| 4  | +46 |
| 6  | +42 |
| 8  | +38 |
| 10 | +28 |

EXAMPLE 3

The process of Example 2 is repeated, but the methyl methacrylate in step 2 is replaced by 225 g of butyl acrylate.

A dispersion with the following characteristics is obtained:

| pH | 7.8 |
|----|-----|
| Solids content | 45% |
| Brookfield viscosity (50 rpm) | 112 mPa/s |
| Average particle diameter | 0.25μ |

The zeta potential measurements are as follows:

| pH | Zeta potential in mV |
|----|----------------------|
| 4  | +49 |
| 6  | +37 |
| 8  | +30 |
| 10 | +27 |

EXAMPLE 4

The process of Example 2 is repeated, but the methyl methacrylate in step 2 is replaced by 225 g of acrylonitrile.

A dispersion with the following characteristics is obtained:

| pH | 8.2 |
|----|-----|
| Solids content | 44.4% |
| Brookfield viscosity (50 rpm) | 240 mPa/s |
| Average particle diameter | 0.22μ |

The zeta potential measurements are as follows:

| pH | Zeta potential in mV |
|----|----------------------|
| 4  | +46 |
| 6  | +40 |
| 8  | +35 |
| 10 | +27 |

EXAMPLE 5

(A) Step 1

The following ingredients are charged cold into a 5 liter reactor:
1,350 g of deionized water
20 g of cetyldimethylbenzylammonium bromide
15 of trimethylaminopropylmethacrylamide chloride
15 g of dimethylaminopropylmethacrylamide
159 g of styrene 129 g of butyl acrylate.

The autoclave is heated to 75° C. 15 g of 2,2'-azobis(2-amidinopropane)hydrochloride are introduced.

(B) Step 2

After about 30 minutes, the degree of conversion is about 90%, and the following are introduced continuously over 5 hours at a constant rate:

901 g of styrene
731 g of butadiene
10 g of tert-dodecylmercaptan.

10 g of 2,2'-azobis(2-amidinopropane)hydrochloride in 400 g of deionized water are then introduced continuously over 5 hours at a constant rate.

After a total running time of 12 hours, 30 minutes, the reaction is stopped by cooling.

A cationic dispersion with the following characteristics is obtained:

| pH | 8.9 |
|---|---|
| Solids content | 42.5% |
| Brookfield viscosity (50 rpm) | 190 mPa/s |
| Average particle diameter | 0.25µ |

The zeta potential measurements are as follows:

| pH | Zeta potential in mV |
|---|---|
| 4 | +52 |
| 6 | +46 |
| 8 | +24 |
| 10 | +20 |

EXAMPLE 6

The process of Example 5 is repeated, but the degree of conversion at the end of step 1 is about 50%, instead of about 90%, corresponding to a reaction time of about 10 minutes.

A dispersion with the following characteristics is obtained:

| pH | 8.6 |
|---|---|
| Solids content | 41.8% |
| Brookfield viscosity (50 rpm) | 175 mPa/s |
| Average particle diameter | 0.22µ |

The zeta potential measurements are as follows:

| pH | Zeta potential in mV |
|---|---|
| 4 | +55 |
| 6 | +48 |
| 8 | +26 |
| 10 | +21 |

EXAMPLE 7

(A) Step 1

The following are charged cold into a 5 liter autoclave, with a propeller-type stirrer rotating at 150 rpm:

1,350 g of water
13 g of cetyldimethylbenzylammonium bromide
6.5 g of acrylamide
26 g of trimethylaminopropylmethacrylamide chloride.

The autoclave is heated to 80° C. When the working temperature is reached, the following ingredients are introduced:

7.5 g of 2,2'-azobis(2-amidinopropane)hydrochloride and 50 g of deionized water are introduced simultaneously and all at once and 1,209 g of styrene and
52 g of dimethylaminopropylmethacrylamide are added continuously over 5 hours at a constant rate.

10 minutes after the working temperature is reached, the following are introduced continuously over 7 hours at a constant rate:

13 g of 2,2'-azobis(2-amidinopropane)hydrochloride
480 g of deionized water.

After a total running time of 11 hours, the reaction is stopped by cooling.

The degree of conversion is 99%.

A dispersion with the following characteristics is obtained:

| pH | 9 |
|---|---|
| Solids content | 40.1% |
| Brookfield viscosity (50 rpm) | 60 mPa/s |
| Average particle diameter | 0.05-0.06µ |

(B) Step 2

The operation described in step 2 of Example 1 is repeated, with 187 g of the dispersion prepared above used as the seed.

An aqueous dispersion with the following characteristics is obtained:

| pH | 7.6 |
|---|---|
| Solids content | 44.8% |
| Brookfield viscosity (50 rpm) | 105 mPa/s |
| Average particle diameter | 0.15µ |

The results of the zeta potential measurements 5 are as follows:

| pH | Zeta potential in mV |
|---|---|
| 4 | +36 |
| 6 | +40 |
| 8 | +28 |
| 10 | +18 |

EXAMPLE 8

Step 1

The process of step 1 of Example 1 is repeated, but the 15 g of trimethylaminopropylmethacrylamide chloride are replaced by 15 g of 1-methyl-2-vinylpyridinium chloride.

A dispersion with the following characteristics is obtained:

| pH | 7.9 |
|---|---|
| solids content | 41.8% |
| Brookfield viscosity (50 rpm) | 215 mPa/s |
| average particle diameter | 0.1µ |

Step 2

The process of step 2 step of Example 1 is repeated, but 179 g of the dispersion prepared in step 1 of this example are used as the seed.

An aqueous dispersion with the following characteristics is obtained:

| pH | 7.8 |
|---|---|
| Solids content | 44.2% |
| Brookfield viscosity (50 rpm) | 108 mPa/s |
| Average particle diameter | 0.25μ |

The results of the zeta potential measurement are as follows:

| pH | Zeta potential in mV |
|---|---|
| 4 | +55 |
| 6 | +48 |
| 8 | +32 |
| 10 | +21 |

EXAMPLE 9

(A) Step 1

The following are charged cold into an autoclave with a 5 liter capacity and a propeller-type stirrer rotating at 150 rpm:

866 g of deionized water
7.5 g of cetyldimethylbenzylammonium bromide
15 g of trimethylaminopropylmethacrylamide chloride.

The autoclave is heated to a temperature of 75° C. When the working temperature is reached, the following are introduced into the autoclave:

7.5 g of 2,2'-azobis(2-amidinopropane)hydrochloride and 50 g of deionized water are introduced simultaneously and all at once,
750 g of butyl acrylate and
660 g of styrene are added continuously at a constant rate over 5 hours.

The reaction is maintained at 75° C. for 4 hours. The degree of conversion is about 90%. 75 g of dimethylaminopropylmethacrylamide are added over 1 hour.

After a total running time of 9 hours, the reaction is stopped by cooling.

An aqueous dispersion with the following characteristics is obtained:

| pH | 7.9 |
|---|---|
| Solids content | 46.3% |
| Brookfield viscosity (50 rpm) | 453 mPa/s |
| Average particle diameter | 0.12μ |

(B) Step 2

The process of step 2 of Example 1 is repeated, 162 g of the dispersion prepared above being taken as the seed.

An aqueous dispersion with the following characteristics is obtained:

| pH | 8.2 |
|---|---|
| Solids content | 44.1% |
| Brookfield viscosity (50 rpm) | 258 mPa/s |
| Average particle diameter | 0.25μ |

The zeta potential measurements are as follows:

| pH | Zeta potential in mV |
|---|---|
| 4 | +50 |
| 6 | +41 |
| 8 | +33 |
| 10 | +25 |

EXAMPLE 10

(a) Step 1

The process of step 1 of Example 1 is repeated.

(B) Step 2

The process of step 2 of Example 1 is repeated, but the 855 g of butadiene are replaced by 855 g of isoprene.

An aqueous dispersion with the following characteristics is obtained:

| pH | 8.2 |
|---|---|
| Solids content | 40.2% |
| Brookfield viscosity (50 rpm) | 103 mPa/s |
| Average particle diameter | 0.28μ |

The zeta potential measurements are as follows:

| pH | Zeta potential in mV |
|---|---|
| 4 | +39 |
| 6 | +28 |
| 8 | +22 |
| 10 | +19 |

EXAMPLE 11

Step 1

The process of step 1 of Example 5 is repeated, but the 159 g of styrene are replaced by 159 g of butyl acrylate. Thus, a total of 288 g of butyl acrylate are used in step 1 of this Example.

Step 2

The process of step 2 of Example 5 is repeated.

An aqueous dispersion with the following characteristics is obtained:

| pH | 8.8 |
|---|---|
| Solids content | 41.8% |
| Brookfield viscosity (50 rpm) | 198 mPa/s |
| Average particle diameter | 0.26μ |

The results of the zeta potential measurements are as follows:

| pH | Zeta potential in mV |
|---|---|
| 4 | +49 |
| 6 | +42 |
| 8 | +26 |
| 10 | +19 |

EXAMPLE 12

(A) Step 1

The process of step 1 of Example 5 is repeated, but the 129 g of butyl acrylate are replaced by 129 g of styrene. Thus, a total of 288 g of styrene are used in step 1 of this example.

(B) Step 2

The process of step 2 of Example 5 is repeated.

An aqueous dispersion with the following characteristics is obtained:

| pH | 8.7 |
|---|---|
| Solids content | 42.5% |
| Brookfield viscosity (50 rpm) | 120 mPa/s |
| Average particle diameter | 0.23μ |

The zeta potential measurements are as follows:

| pH | Zeta potential in mV |
|---|---|
| 4 | +54 |
| 6 | +41 |
| 8 | +30 |
| 10 | +22 |

EXAMPLE 13

(A) Step 1

The process of step 1 of Example 5 is repeated, but the degree of conversion is limited to 30% instead of 90%.

(B) Step 2

The process of step 2 of Example 5 is repeated.

An aqueous dispersion with the following characteristics is obtained:

| pH | 8.8 |
|---|---|
| Solids content | 41.6% |
| Brookfield viscosity (50 rpm) | 129 mPa/s |
| Average particle diameter | 0.23μ |

The zeta potential measurements are as follows:

| pH | Zeta potential in mV |
|---|---|
| 4 | +50 |
| 6 | +42 |
| 8 | +31 |
| 10 | +23 |

I claim:

1. A cationic latex of at least one copolymer based on at least one conjugated diene, formed by the steps of:
(A) preparing a pH independent cationic aqueous dispersion of particles at least substantially free from anionic species by reacting
(i) at least one unsaturated tertiary nitrogen compound, selected from the group consisting of
(a) an N-(ω-dialkylaminoalkyl)amide of an unsaturated carboxylic acid, having the formula:

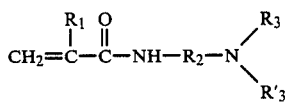

where $R_1$ is a hydrogen atom or a $C_1$-$C_4$ alkyl group, $R_2$ is a $C_1$-$C_{12}$ alkylene group, and $R_3$ and $R'_3$ are either $C_1$-$C_6$ alkyl groups, or phenyl groups optionally substituted by a $C_1$-$C_9$ alkyl radical,
(b) an unsaturated amino-ester having the formula:

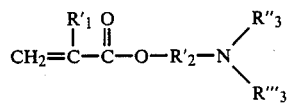

wherein $R'_1$ is a $C_1$-$C_5$ alkyl group, $R'_2$ is a linear or branched alkylene group with at least two carbon atoms, and $R''_3$ and $R'''_3$, which may be identical, are either a $C_1$-$C_6$ alkyl group, optionally substituted by a hydroxyl radical, or a phenyl group, optionally substituted by a $C_1$-$C_9$ alkyl radical, wherein the total number of carbon atoms contained in the radicals $R'_2$, $R''_3$, and $R'''_3$ is greater than 8, and
(c) a heterocyclic nitrogen compound with a nitrogen or carbon atom substituted by a vinyl group, with
(ii) a cationic aqueous emulsion mixture at least substantially free from anionic species and containing:
(a) at least one non-ionic monomer selected from the group consisting of vinylaromatic compounds, vinyl esters, ethylenic nitriles, ethylenic carboxylic acid esters, dialkyl esters of ethylenic di-carboxylic acids, ethylenic amides, and the N-substituted derivatives of ethylenic amides;
(b) at least one unsaturated salt of a polycoordinated onium of a group 5a or 6a element capable of polymerizing with said monomer;
(c) a cationic or non-ionic polymerization initiator; and
(d) a cationic or non-ionic emulsifier,
and wherein for every 100 parts by weight of said non-ionic monomer of (ii)(a) used, about 2 to 10 parts by weight of said unsaturated salt of polycoordinated onium of a group 5a or 6a element is present, and a total of about 4 to 15 parts by weight of said salt and said unsaturated nitrogen compound taken together is used,
said nonionic monomer being converted to polymer in said reaction in a degree of up to at least about 30%; and
(B) polymerizing, in said aqueous dispersion, at least one conjugated diene or a mixture of said conjugated diene and at least one non-ionic monomer in the presence of a cationic or non-ionic polymerization initiator to form said cationic latex of copolymer.

2. The latex of claim 1, in which $R_1$ represents a $C_1$-$C_2$ alkyl group, $R_2$ represents a $C_1$-$C_8$ alkylene group and $R_3$ and $R'_3$ represent $C_1$-$C_4$ alkyl groups.

3. The latex of claim 2, wherein the unsaturated, tertiary nitrogen compound is selected from the group consisting of dimethylaminomethylacrylamide, dimethylaminomethylmethacrylamide, dimethylaminoethylacrylamide, and dimethylaminoethylmethacrylamide.

4. The latex of claim 1, in which $R'_1$ is a $C_1$-$C_2$ alkyl group, $R'_2$ is a linear or branched $C_2$-$C_{12}$ alkylene group and $R''_3$ and $R'''_3$ are $C_1$-$C_4$ alkyl groups, with the total number of carbon atoms contained in the radicals $R'_2$, $R''_3$ and $R'''_3$ being greater than or equal to 10.

5. The latex of claim 1, wherein the unsaturated, tertiary nitrogen compound is selected from the group consisting of ditert-butylaminoethyl methacrylate, ditert-butylaminopropyl methacrylate and dipentylaminoethyl methacrylate.

6. The latex of claim 1 wherein said at least one conjugated diene is selected from the group consisting of butadiene, isoprene, chloroprene, penta-1,3-diene, dimethylbutadiene, cyclopentadiene, and mixtures thereof.

7. A process for making a cationic latex of at least one copolymer based on at least one conjugated diene, comprising the steps of:

(a) preparing a pH independent cationic aqueous dispersion of particles free or at least substantially free from anionic species by reacting:
  (i) at least one unsaturated tertiary nitrogen compound selected from the group consisting of
  (A) an N-(ω-dialkylaminoalkyl) amide of an unsaturated carboxylic acid, having the formula:

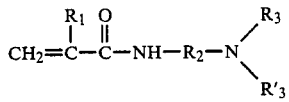

where $R_1$ is a hydrogen atom or a $C_1-C_4$ alkyl group, $R_2$ is a $C_1-C_{12}$ alkylene group, and $R_3$ and $R'_3$ are either $C_1-C_6$ alkyl groups, or phenyl groups optionally substituted by a $C_1-C_9$ alkyl radical,
  (B) an unsaturated amino-ester having the formula:

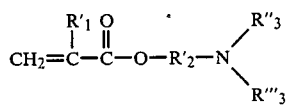

wherein $R'_1$ is a $C_1-C_5$ alkyl group, $R'_2$ is a linear or branched alkylene group with at least two carbon atoms, and $R''_3$ and $R'''_3$, which may be identical, are either a $C_1-C_6$ alkyl group, optionally substituted by a hydroxyl radical, or a phenyl group, optionally substituted by a $C_1-C_9$ alkyl radical, wherein the total number of carbon atoms contained in the radicals $R'_2$, $R''_3$, and $R'''_3$ is greater than 8, and
  (C) a heterocyclic nitrogen compound with a nitrogen or carbon atom substituted by a vinyl group, with
  (ii) a cationic aqueous emulsion mixture at least substantially free from anionic species and containing cationic species, of
    (A) at least one non-ionic monomer selected from the group consisting of vinylaromatic compounds, vinyl esters, ethylenic nitriles, ethylenic carboxylic acid esters, dialkyl esters of ethylenic dicarboxylic acids, ethylenic amides, and the N-substituted derivatives of ethylenic amides;
    (B) at least one unsaturated salt of a polycoordinated onium of a group 5a or 6a element capable of copolymerizing with said monomer;
    (C) a cationic or non-ionic polymerization initiator; and
    (D) a cationic or non-ionic emulsifier, and
  wherein for every 100 parts by weight of said non-ionic monomer of (ii)(A) used, about 2 to 10 parts by weight of said unsaturated salt of polycoordinated onium of a group 5a or 6a element is present, and a total of about 4 to 15 parts by weight of said salt and said unsaturated nitrogen compound taken together is used, and
(b) polymerizing in said aqueous dispersion, at least one conjugated diene or a mixture of said conjugated diene and at least one non-ionic monomer in the presence of a cationic or non-ionic polymerization initiator.

8. The process according to claim 7, wherein said nitrogen compound is added to said aqueous emulsion mixture during any stage of the polymerization of said non-ionic monomer.

9. The process according to claim 7, wherein said unsaturated salt of a polycoordinated onium is added to said aqueous emulsion mixture before or simultaneously with said nitrogen compound.

10. The process according to claim 7, wherein a cationic seed, comprising a polymer or copolymer prepared by aqueous emulsion polymerization, in a cationic medium, of said at least one non-ionic monomer in the presence of said unsaturated salt of a polycoordinated onium, is present in said aqueous emulsion mixture at the start of the polymerization of said non-ionic monomer.

11. The process according to claim 7 in which said nitrogen compound is an N-(ω-dialkylaminoalkyl)amide and $R_1$ is a $C_1-C_2$ alkyl group, $R_2$ is a $C_1-C_8$ alkylene group, and $R_3$ and $R'_3$ are $C_1-C_4$ alkyl groups.

12. The process according to claim 11, wherein said N-(ω-dialkylaminoalkyl)amide is selected from the group consisting of dimethylaminomethylacrylamide, dimethylaminomethylmethacrylamide, dimethylaminoethylacrylamide and dimethylaminoethylmethacrylamide.

13. The process according to claim 7 in which said nitrogen compound is an unsaturated amino ester and $R'_1$ is a $C_1-C_2$ alkyl group, $R'_2$ is a linear or branched $C_2-C_{12}$ alkylene group, and $R''_3$ and $R'''_3$ are $C_1-C_4$ alkyl groups, with the total number of carbon atoms in the radicals $R'_2$, $R''_3$, and $R'''_3$ being greater than or equal to 10.

14. A process according to claim 13, wherein said unsaturated amino ester is selected from the group consisting of ditert-butylaminoethyl methacrylate, ditert-butylaminopropyl methacrylate, and dipentylaminoethyl methacrylate.

15. A process according to claim 7, wherein said unsaturated salt of a polycoordinated onium is an unsaturated quaternary ammonium salt having the formula:

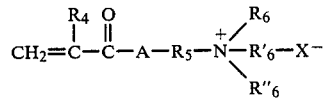

where $X^-$ is $Cl^-$, $Br^-$, $I^-$, $SO_4H^-$, $SO_4^{--}$, $CH_3SO_4^-$, $C_2H_5SO_4^-$, or $CH_3COO^-$, $R_4$ is a hydrogen atom or a methyl group, A is an oxygen atom or an —NH— group, $R_5$ is a linear or branched alkylene group with 1 to 18 carbon atoms, and
  $R_6$, $R'_6$, and $R''_6$, which may be identical or different, are either an alkyl group with 1 to 4 carbon atoms, optionally substituted by a hydroxyl radical, or a phenyl group, optionally substituted by an alkyl radical with 1 to 9 carbon atoms, wherein the total number of carbon atoms in groups $R_5$, $R_6$, $R'_6$, and $R''_6$ is greater than 4 if A is oxygen.

16. The process according to claim 15, wherein said ammonium salt is selected from the group consisting of trimethylaminoethylacrylamide chloride, trimethylaminopropylacrylamide bromide, trimethylaminopropylmethacrylamide bromide, trimethylaminobutylacrylamide methyl-sulfate, trimethylaminobutylmethacrylamide methyl-sulfate, and trimethylaminopropyl methacrylate chloride.

17. The process according to claim 7, wherein said unsaturated salt of a polycoordinated onium is selected from the group consisting of an unsaturated salt of pyridinium, quinolinium, imidazolium, and benzimadazolium.

18. The process according to claim 7, wherein the polymerization temperature of said non-ionic monomer is between 60° C. and 90° C. and the pH is from 3 to 12.

19. The process according to claim 7 wherein the amount of said conjugated diene corresponds to about 20 to 80% by total weight of all monomers used in both steps (a) and (b).

20. The process according to claim 19 wherein the amount of said conjugated diene corresponds to about 25 to 65% by total weight of all monomers used in both steps (a) and (b).

21. The process according to claim 7 wherein the polymerization temperature of said conjugated diene is between 60° C. and 90° C. and the pH is from 3 to 12.

22. The process according to claim 7 wherein the amount of said non-ionic monomer polymerized with said conjugated diene corresponds to as much as 80% by total weight of all monomers used in both steps (a) and (b).

23. A process comprising use of said cationic latex of claim 1 as a binder.

24. A cationic latex of at least one copolymer based on at least one conjugated diene, formed by the steps of:
(A) preparing a pH independent cationic aqueous dispersion of particles by reacting (i) at least one unsaturated tertiary nitrogen compound not capable of being hydrolyzed in an acid or alkaline medium, with (ii) a cationic aqueous emulsion reaction mixture containing:
  (a) at least one non-ionic monomer capable of being copolymerized with said unsaturated nitrogen compound to form a synthetic polymer(s),
  (b) at least one unsaturated salt of a polycoordinated onium of a group 5a or 6a element capable of copolymerizing with said monomer(s),
  (c) a cationic or non-ionic polymerization initiator; and
  (d) a cationic or non-ionic emulsifier; said non-ionic monomer(s) being converted to polymer(s) in said reaction in a degree of up to at least about 30%; and
(B) polymerizing in said aqueous dispersion at least one conjugated diene or a mixture of said conjugated diene and at least one non-ionic monomer in the presence of a cationic or non-ionic polymerization initiator to form said cationic latex of copolymer(s).

25. The cationic latex of claim 24 wherein said at least one unsaturated tertiary nitrogen compound (i) is selected from the group consisting of:
(a) an N-(ω-dialkylaminoalkyl)amide of an unsaturated carboxylic acid, having the formula:

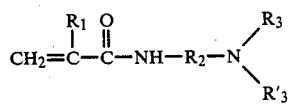

wherein $R_1$ is a hydrogen atom or a $C_1$–$C_4$ alkyl group, $R_2$ is a $C_1$–$C_{12}$ alkylene group, and $R_3$ and $R'_3$ are either $C_1$–$C_6$ alkyl groups, or phenyl groups optionally substituted by a $C_1$–$C_9$ alkyl radical, (b) an unsaturated amino-ester having the formula:

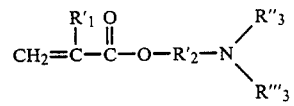

wherein $R'_1$ is a $C_1$–$C_5$ alkyl group, $R'_2$ is a linear or branched alkylene group with at least two carbon atoms, and $R''_3$ and $R'''_3$, which may be identical, are either a $C_1$–$C_6$ alkyl group, optionally substituted by a hydroxyl radical, or a phenyl group, optionally substituted by a $C_1$–$C_9$ alkyl radical, wherein the total number of carbon atoms contained in the radicals $R'_2$, $R''_3$, and $R'''_3$ is greater than 8, and (c) a heterocyclic nitrogen compound with a nitrogen or carbon atom substituted by a vinyl group and wherein said at least one non-ionic monomer is selected from the group consisting of vinylaromatic compounds, vinyl esters, ethylenic nitriles, ethylenic carboxylic acid esters, dialkyl esters of ethylenic dicarboxylic acids, ethylenic amides, and the N-substituted derivatives of ethylenic amides.

26. The cationic latex of claim 25, wherein for every 100 parts by weight of said non-ionic monomer of (ii)(a) used, about 2 to 10 parts by weight of said unsaturated salt of polycoordinated onium of a group 5a or 6a element is present, and a total of about 4 to 15 parts by weight of said salt and said unsaturated nitrogen compound taken together is used.

27. A process for making a cationic latex of at least one copolymer based on at least one conjugated diene, comprising the steps of:
(a) preparing a pH independent cationic aqueous dispersion of particles by reacting:
  (i) at least one unsaturated tertiary nitrogen compound not capable of being hydrolyzed in an acid or alkaline medium, with
  (ii) a cationic aqueous emulsion reaction mixture, containing
    (a) at least one non-ionic monomer capable of being copolymerized with said unsaturated nitrogen compound to form a synthetic polymer(s), and
    (b) at least one unsaturated salt of a poly-coordinated onium of a group 5a or 6a element capable of copolymerizing with said monomer(s);
    (c) a cationic or non-ionic polymerization initiator,
    (d) a cationic or non-ionic emulsifier, said non-ionic monomer(s) being converted to polymer(s) in said reaction in a degree of up to at least about 30%; and
(b) polymerizing, in said aqueous dispersion, at least one conjugated diene or a mixture of said conjugated diene and at least one non-ionic monomer in the presence of a cationic or non-ionic polymerization initiator to form said cationic latex of copolymer(s).

* * * * *